US012529471B2

(12) United States Patent
Yang et al.

(10) Patent No.: US 12,529,471 B2
(45) Date of Patent: Jan. 20, 2026

(54) STRAP LIGHTING

(71) Applicant: Kuzco Lighting LLC, Las Vegas, NV (US)

(72) Inventors: Nathan Yang, Surrey (CA); Ryan Pauly, New Rochelle, NY (US)

(73) Assignee: Kuzco Lighting LLC, Las Vegas, NV (US)

( * ) Notice: Subject to any disclaimer, the term of this patent is extended or adjusted under 35 U.S.C. 154(b) by 0 days.

(21) Appl. No.: 18/824,775

(22) Filed: Sep. 4, 2024

(65) Prior Publication Data

US 2025/0075891 A1 Mar. 6, 2025

Related U.S. Application Data

(63) Continuation-in-part of application No. 18/807,581, filed on Aug. 16, 2024.

(60) Provisional application No. 63/536,693, filed on Sep. 5, 2023.

(51) Int. Cl.

| | |
|---|---|
| ***F21V 21/08*** | (2006.01) |
| ***F21S 2/00*** | (2016.01) |
| ***F21V 17/10*** | (2006.01) |
| ***F21V 21/002*** | (2006.01) |
| ***F21V 23/06*** | (2006.01) |
| *F21Y 115/10* | (2016.01) |

(52) U.S. Cl.

CPC .......... *F21V 21/0816* (2013.01); *F21S 2/005* (2013.01); *F21V 17/107* (2013.01); *F21V 21/002* (2013.01); *F21V 23/06* (2013.01); *F21Y 2115/10* (2016.08)

(58) Field of Classification Search

CPC .. F21V 21/0816; F21V 17/107; F21V 21/002; F21V 23/06; F21V 23/001; F21S 2/005; F21Y 2115/10

See application file for complete search history.

(56) References Cited

U.S. PATENT DOCUMENTS

| | | | | | |
|---|---|---|---|---|---|
| 3,708,608 | A * | 1/1973 | Wyman | F21V 21/002 | 439/425 |
| 5,051,877 | A * | 9/1991 | Liao | F21S 4/10 | 362/249.16 |
| 5,158,360 | A * | 10/1992 | Banke | F21V 21/008 | 439/425 |
| 5,228,774 | A * | 7/1993 | Liao | H01R 12/67 | 362/396 |
| 5,446,640 | A * | 8/1995 | Lin | H01R 4/2406 | 362/396 |
| 5,622,425 | A | 4/1997 | Lin | | |
| 5,743,758 | A * | 4/1998 | Cheng | H01R 33/9651 | 200/51.14 |
| 5,876,236 | A * | 3/1999 | Chen | F21V 21/002 | 439/280 |
| 6,095,847 | A * | 8/2000 | Lin | F21V 19/006 | 439/280 |
| 11,020,285 | B1 * | 6/2021 | King | H01R 43/16 | |
| 2004/0009729 | A1 | 1/2004 | Hill et al. | | |

(Continued)

*Primary Examiner* — Tsion Tumebo

(74) *Attorney, Agent, or Firm* — DLA Piper LLP (US)

(57) ABSTRACT

Disclosed here are systems and methods for improved modular lighting systems wherein a flexible fabric is woven with conductive material and connected to a power source. A modular and repositionable light module is then electrically connected to the flexible fabric and thereby power the light module by way of the woven conductive material.

10 Claims, 12 Drawing Sheets

(56) References Cited

U.S. PATENT DOCUMENTS

| | | | | |
|---|---|---|---|---|
| 2015/0170480 | A1* | 6/2015 | Chen | F21V 33/0008<br>362/396 |
| 2019/0341718 | A1 | 11/2019 | Yu | |
| 2020/0069250 | A1 | 3/2020 | Chahine et al. | |
| 2022/0045467 | A1* | 2/2022 | MulHolland | F21V 23/001 |
| 2022/0181808 | A1* | 6/2022 | Diez | H01R 13/629 |
| 2022/0338572 | A1* | 10/2022 | Knies | A44B 17/0064 |
| 2025/0075890 | A1 | 3/2025 | Yang et al. | |

* cited by examiner

STRAP LIGHTING

CROSS REFERENCE TO RELATED APPLICATIONS

This application relates to and is a continuation-in-part of U.S. patent application Ser. No. 18/807,581 filed on Aug. 16, 2024, which relates to and claims priority to U.S. Provisional Application No. 63/536,693 filed on Sep. 5, 2023, both of which are hereby incorporated by reference in their entireties.

TECHNICAL FIELD

This application relates to the field of lighting and lighting fixtures and/or interaction between the component parts of a lighting fixture assembly.

BACKGROUND

Previously, lighting fixtures suffered from inherent drawbacks based on their inability to be customized and arranged in areas that were unfit for traditional wall or ceiling mounts. There is a great need for a new customizable lighting system for interior or exterior of the home or office in areas that are inaccessible to traditional wall or ceiling mounts.

SUMMARY

Systems and methods here include improved lighting systems wherein a flexible fabric is woven with conductive material and connected to a power source. A modular and repositionable light module is then electrically connected to the flexible fabric and thereby power the light module by way of the woven conductive material.

Additionally or alternatively, systems and methods may include a modular light system, including a flexible fabric strap with a length longer than a width, wherein the strap includes two lines of conductive material running substantially along the length, a power security system in communication with a power source, the power security system including, a base with a hinge portion, a hinged lid configured to pivot about the hinged portion of the base and secure to the base in a closed position, an electrical connection unit mounted on a spring, configured to be exposed between the base and the hinged lid and configured to conduct electricity through the spring to the electrical connection unit. Additionally or alternatively, systems and methods may include a light system in communication with the flexible fabric strap with contact elements that receive electricity from the power source, through the power security system and the spring, the electrical connection unit, and the two parallel lines of conductive material in the strap. In some examples, additionally or alternatively, the electrical connection unit is a metal arched plate. In some examples, additionally or alternatively, the flexible fabric strap is woven. In some examples, additionally or alternatively, further comprising a second electrical connection unit mounted on a spring, a third electrical connection unit mounted on a spring. In some examples, additionally or alternatively, further comprising a fourth electrical connection unit mounted on a spring. In some examples, additionally or alternatively, the light source includes an LED light. In some examples, additionally or alternatively, the base includes a latch configured to latch over a corresponding lip on the lid when the lid is in a closed position.

In some examples, additionally or alternatively, systems and methods here may include a base with a first hole and a second hole, a metal plate with a first arch and a second arch, wherein the metal plate is mounted such that the first arch extends into and through the first hole of the base plate and the second arch is extends into and through the second hole of the base plate, a compression spring mounted to the metal plate configured to provide a return force if compressed, a hinged lid mounted to the base plate configured to be in an open position and a closed position, the closed position being closed over the first hole and second hole with the first arch and second arch, a light in electrical communication with the compression spring and the metal plate, a flexible ribbon strap with a length and a width, wherein the flexible ribbon strap having two electrically conductive elements running the length, wherein the flexible ribbon strap configured to be secured between the base and hinged lid when the lid is in the closed position, and the flexible ribbon strap two electrically conductive elements aligned to the first arch and second arch of the metal plate.

In some examples, additionally or alternatively, the base plate includes a third and fourth hole. In some examples, additionally or alternatively, further comprising a second metal plate with a first arch and a second arch, the second metal plate first arch configured to mount through the third hole in the base plate and the second metal plate second arch configured to mount through the fourth hole in the base plate, and a second spring mounted to the second metal plate configured to provide a return force if compressed. In some examples, additionally or alternatively, the base plate includes a fifth and sixth hole. In some examples, additionally or alternatively, further comprising a third metal plate with a first arch and a second arch, the third metal plate first arch configured to mount through the fifth hole in the base plate and the third metal plate second arch configured to mount through the sixth hole in the base plate, and a third spring mounted to the third metal plate configured to provide a return force if compressed. In some examples, additionally or alternatively, the base plate includes a seventh and eighth hole. In some examples, additionally or alternatively, further comprising a fourth metal plate with a first arch and a second arch, the fourth metal plate first arch configured to mount through the seventh hole in the base plate and the fourth metal plate second arch configured to mount through the eighth hole in the base plate, and a fourth spring mounted to the fourth metal plate configured to provide a return force if compressed. In some examples, additionally or alternatively, the hinged lid includes three rows of raised portions configured between the four metal plates with arches mounted through the holes in the base.

BRIEF DESCRIPTION OF THE DRAWINGS

For a better understanding of the embodiments described in this application, reference should be made to the Detailed Description below, in conjunction with the following drawings in which like reference numerals refer to corresponding parts throughout the figures.

FIG. 19 s another example diagram of spring connectors according to embodiments described herein.

DETAILED DESCRIPTION

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the disclosures to these particular embodiments.

Overview

The light system described here may utilize a flexible fabric woven with electrically conductive material to connect a power source to a light source. In such a way, the light source may be clamped or otherwise secured to the flexible fabric and thereby connected to the power source. Such arrangements may allow for light sources to be located in areas that are suspended, hanging, or slung between or over areas that a traditional wall or ceiling mount may not be able to achieve. Additional or alternatively, such arrangements may be movable, adaptable, changeable, and otherwise adjustable such that the light modules may be swapped out, changed, positioned, repositioned, and customized in innumerable combinations and permutations.

Figure 1:
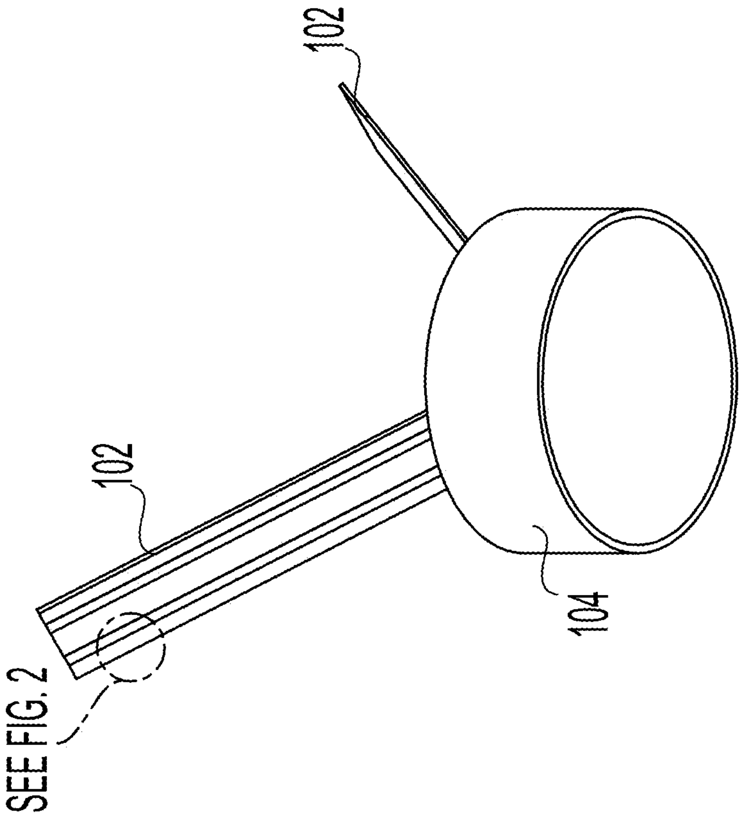
FIG. 1 is an example diagram of a lighting fixture according to embodiments described herein.

FIG. 1 shows an example of a light fixture 104 attached to and powered by a strap 102. The light fixture has no other connections to a surface and is both powered by and supported by the strap 102.

Strap Examples

In the systems and methods described herein, the straps may be used not only to support any number of light fixtures, but also to power and control the operation of the same light fixtures. Such a design allows for light fixtures to be able to be arranged in novel ways such as hung from a strap on a wall, traversing an area with two ends of a strap secured but a middle suspended, wrapped around a pole or object.

Additionally, the strap design allows for the customization of light fixtures attached to the straps. Not only can such light fixtures be arranged on any place on a strap, any number of lights may be arranged, rearranged, swapped, changed, altered, moved or customized. Because little or no hardware may be necessary to attach the example light fixtures to the strap, the user ease of customization and arrangement may be achieved.

Figure 2:
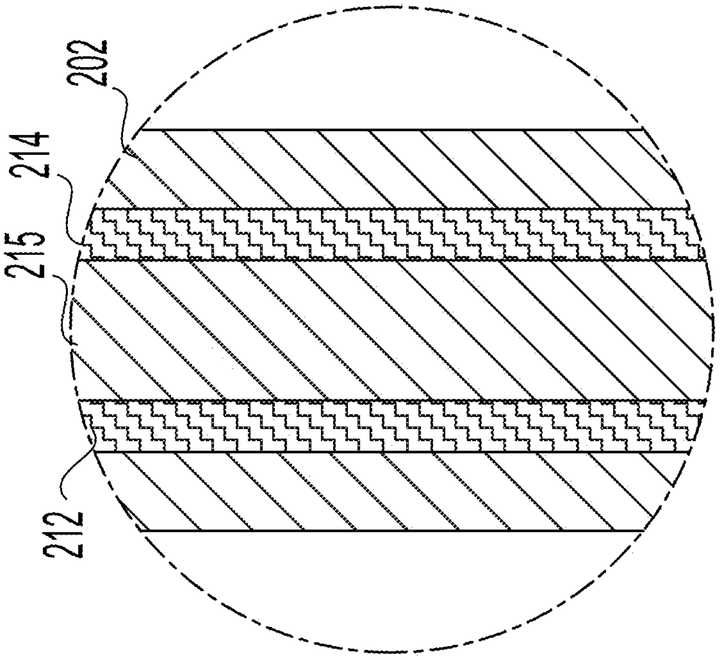
FIG. 2 is an example detail diagram of a lighting fixture strap according to embodiments described herein.

FIG. 2 shows a detail close up detail of the strap 202 as described herein. The strap may be made of any kind of material such as plastic, nylon, rubber, leather, elastic, cotton, or any blend of any of these or other materials. The strap may be woven, plaited, braided or assembled in any fashion including a solid piece of material. In many examples, the strap is flexible and able to be wrapped around an object or affixed to a surface at least at one end and in some examples two ends, and in some example intermediary portions of the strap between the two ends. In some examples, the strap is or includes plastic, nylon, cotton, Kevlar, carbon fiber, rubber, lycra, or any other kind of flexible material.

In some examples, the strap has a thickness of ¼ inch and a width of two inches. In some examples, the strap has a thickness of ⅛$^{th}$ inch, ⅜$^{th}$ inch, or any other thickness. In some examples, the strap may have a width of ¾ inch, one inch, 1¼ inches, 1½ inches, 1¾ inches, 2 inches, 2¼ inches, 2½ inches, 2¾ inches, 3 inches or any other width.

In some examples, the strap has a length of ten feet. In some examples, the strap has a length of one foot, two feet, three feet, four feet, five feet, six feet, seven feet, eight feet, nine feet, ten feet, fifteen feet, twenty feet, or any other length of strap.

In some examples, the strap includes an electrically conductive material. As shown in FIG. 2, the strap 202 includes conductive material 212, 214 that run the length of the strap or at least a portion of the length of the strap. In such examples, the entirety of the strap includes parallel lines of electrically conductive material 212, 214. Such electrically conductive material may be used to conduct electricity or electric commands from a source to any number of light fixtures attached to the strap as described herein. In some examples, the conductive material 212, 214 may be ⅛ inch wide. In some examples, the conductive material 212, 214 may be ¼ inch wide, ½ inch wide or any width that allows for a gap 215 between the two parallel lines 212, 214.

In some examples, the electrically conductive material 212, 214 is arranged in two parallel rows on the strap, with a gap between the two. In such examples, the strap itself may act as an insulator between the two electrically conductive rows. In some examples, the gap 215 may be ¼ inch wide, ½ inch wide, ¾ inch wide, one inch wide, one and ½ inch wide, or any other distance. In any example, the gap 215 should be wide enough such that the two parallel conductive lines 212, 214 may not touch or get near each other. In such examples, the two parallel conductive lines 212, 214 may be wide enough apart such that the two electric conductors (320, 322 in FIG. 3 etc.) do not touch when secured to the light source. In such examples, the conductive material act as the wires to the light source (104 in FIG. 1). As such, one of the lines of conductive material 212 may be the positive wire and the other line of conductive material 214 may be the negative or neutral wire. Additionally or alternatively, the other line of conductive material 214 may act as the positive wire and the other line of conductive material 212 may act as the negative or neutral wire. The wire arrangement may be determined on how the power unit is arranged as described herein. The electrically conductive lines or rows 212, 214 may provide power and/or electrical commands to any number of light fixtures affixed to the strap as described herein.

Such electrically conductive material may be woven metal wires, metal plaited onto the strap, metal sprayed onto the strap, metal melted onto the strap, metal glued to the strap, metal or any other kind of way to adhere metal or other electrically conductive material to the strap. In such examples, metal may be any electrically conductive material such as but not limited to steel, copper, brass, aluminum, iron, lead, gold, zinc, silver, or any combination or permutation of these or other materials.

By providing power and control of any light fixture attached to the strap, these arrangements may be achieved.

Light Source Examples

The light sources (104 in FIG. 1 for example) may be a typical light source such as a light emitting diode (LED), incandescent, fluorescent, halogen, or other light source as known. Such a light source may include a connection to the power source as shown in FIG. 3.

Figure 3:
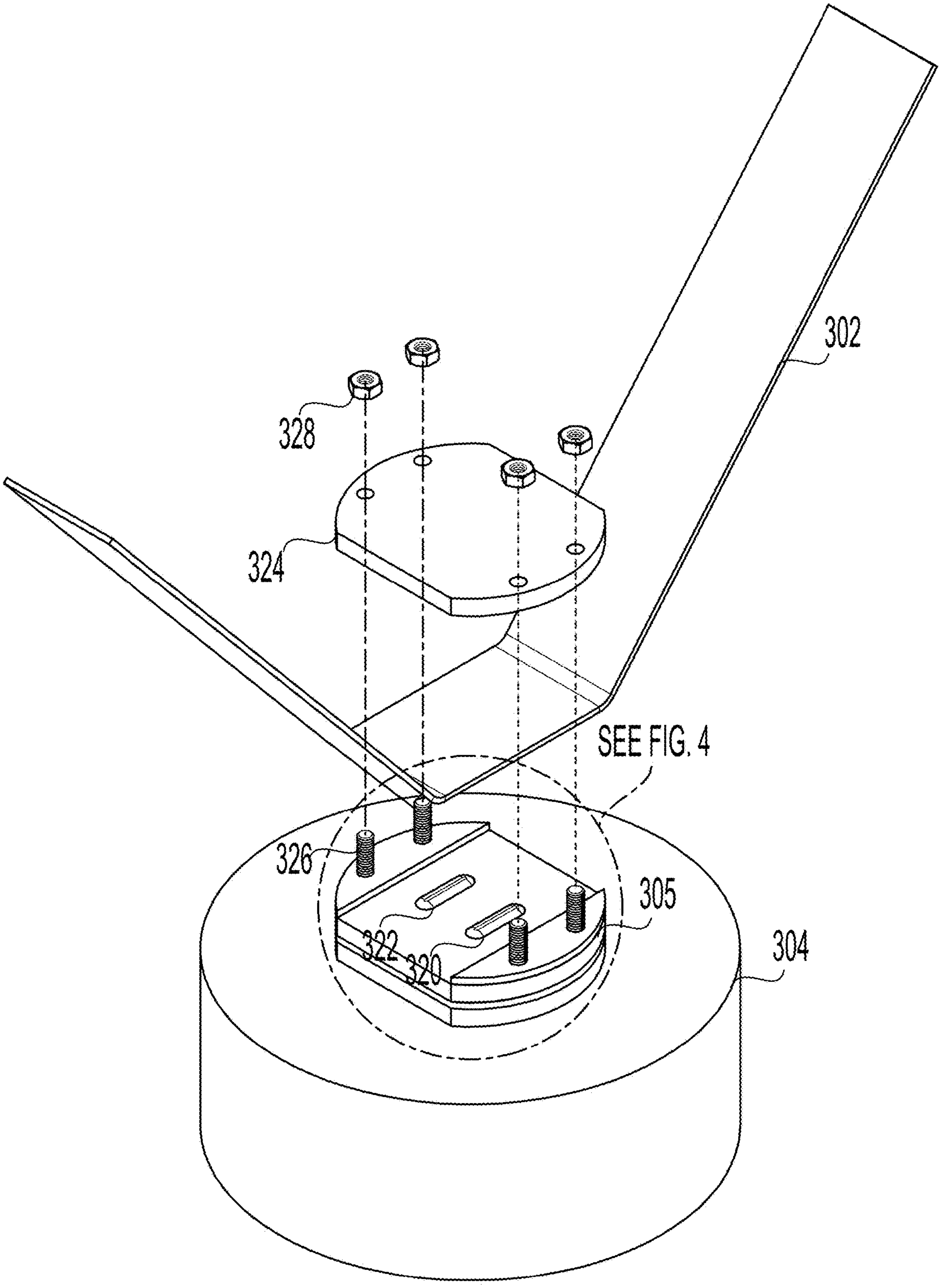
FIG. 3 is an example exploded diagram of a lighting fixture according to embodiments described herein.

As shown in FIG. 3, the light source 304 includes a connection arrangement 305 on the side opposite to the light. The purpose of the connection arrangement is to secure the strap 302 to the light source 304 as well as power and command the light source 304. Included in the connection arrangement 305 are two connectors 320, 322. These connectors 320, 322 may be electrically conductive units that transport electricity to the light source 304. In some examples, these connectors 320, 322 may include compression spring mounts 423 in the connection arrangement 305 that allow for the connectors 320, 322 to be depressed into the connection arrangement 305 if pressure is applied, but also provide a force pushing outward from the connection arrangement 305 to press against the strap 302 and the two respective electrically conductive lines on the strap (212, 214 in FIG. 2). In such a way, a more solid or secure electrical connection may be made of the connectors 320, 322 and the strap 302 with the two respective electrically conductive lines on the strap (212, 214 in FIG. 2). In some examples, each electrical connectors 320, 322 may be ¼ inch long, they may be ½ inch long, in some examples, they may be ⅛ inch long. In some examples they may be ¼ inch wide. In some examples they may be ⅛ inch wide. In some examples, each of the electrical connectors 320, 322 may be spaced apart such that they match up to the strap 302 and the two respective electrically conductive lines on the strap (212, 214 in FIG. 2).

FIG. 3 also shows a screw connector example with bolts 326 mounted in the connection arrangement 305 that fit through holes in the cover plate 324 and nuts 328 secure to the bolts 326. When the strap 302 is fit between the cover plate 324 and connection arrangement 305 and the nuts 328 tightened to the bolts 326, the light 304 is then connected to the strap 302 and secured in place. The light 304 is thereby also electrically connected to the strap 302 by way of the electrical connectors 322, 320 that press onto the two respective electrically conductive lines on the strap (212, 214 in FIG. 2). In such a way, the light 304 may then be both powered and controlled by way of the strap 302 and secured in place on it for mounting and display.

Figure 4:
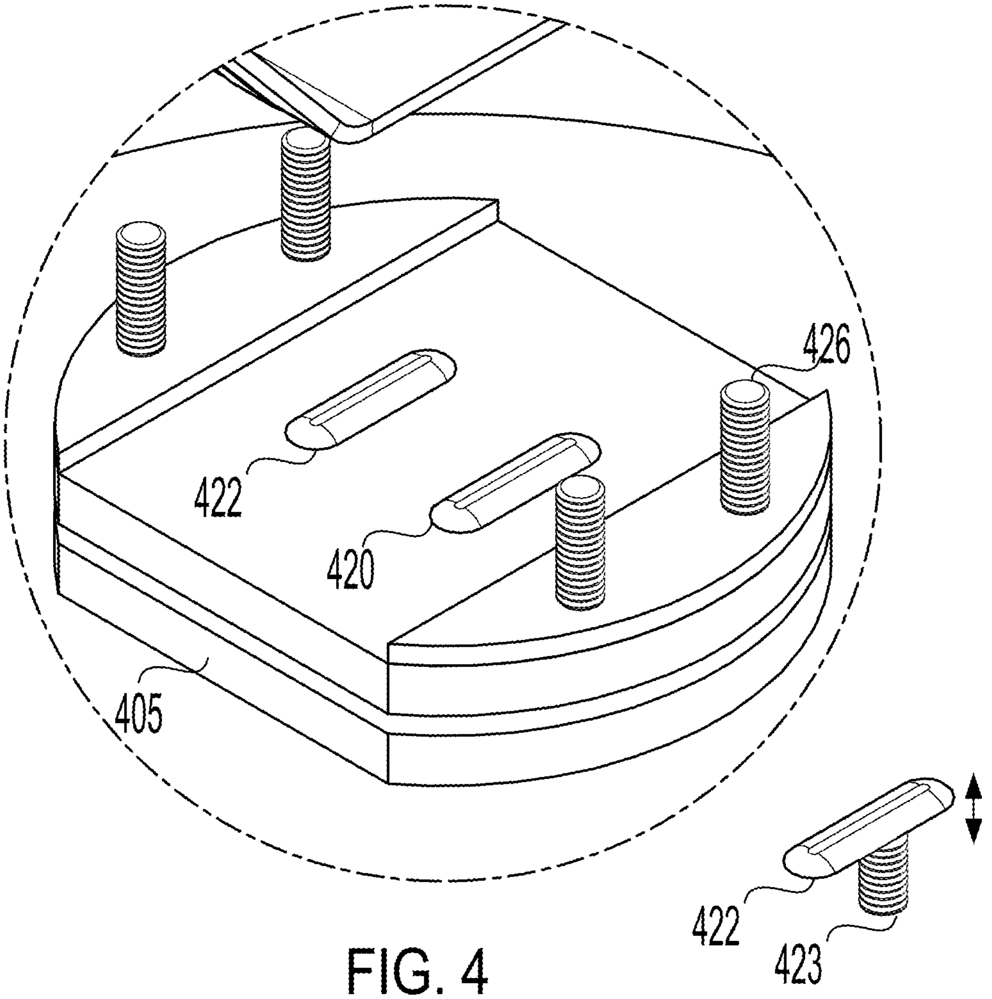
FIG. 4 is an example detail diagram of a lighting fixture connector according to embodiments described herein.

FIG. 4 shows a detail close up of the connection arrangement 405 with the electrical connectors 420, 422 and the bolts 426 for securing to the cover plate and nuts to sandwich and secure the strap to the light. As described, the electrical connectors 420, 422 may be electrically conductive pads made of metal or other electrically conductive material and are wired to the light source as described herein.

Figure 6:
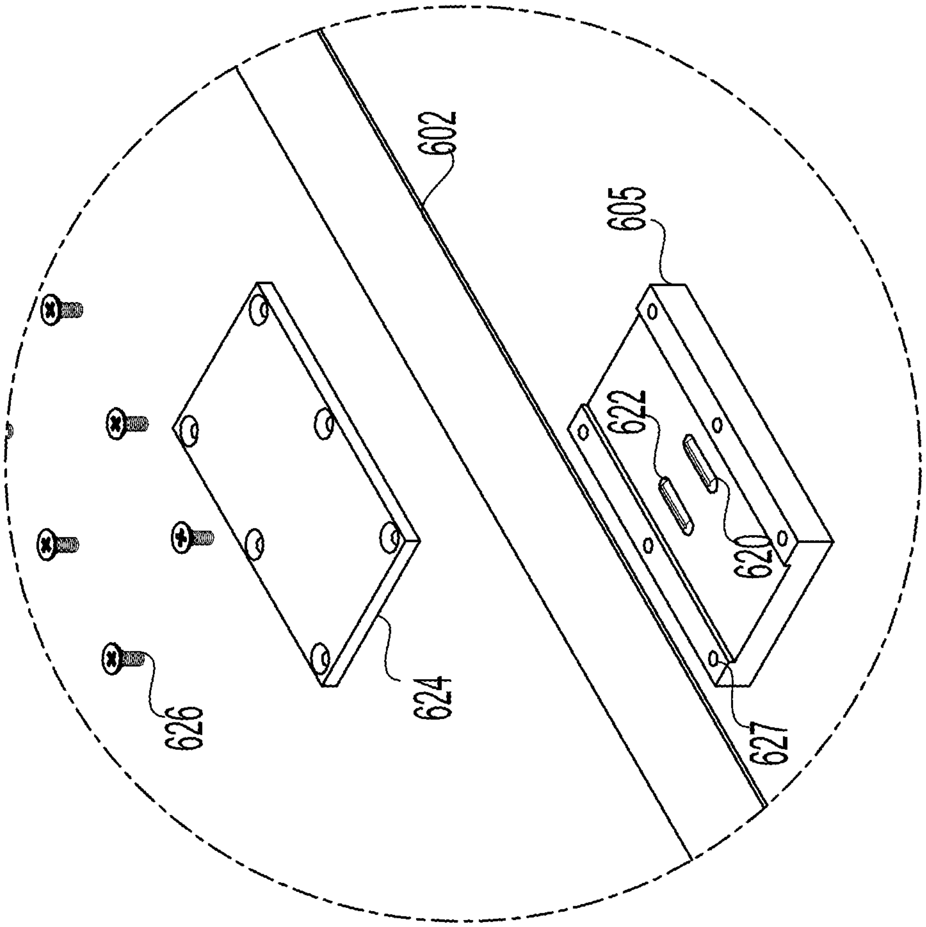
FIGS. 5-6 are example exploded diagrams of lighting fixture screw connections according to embodiments described herein.
Figure 5:
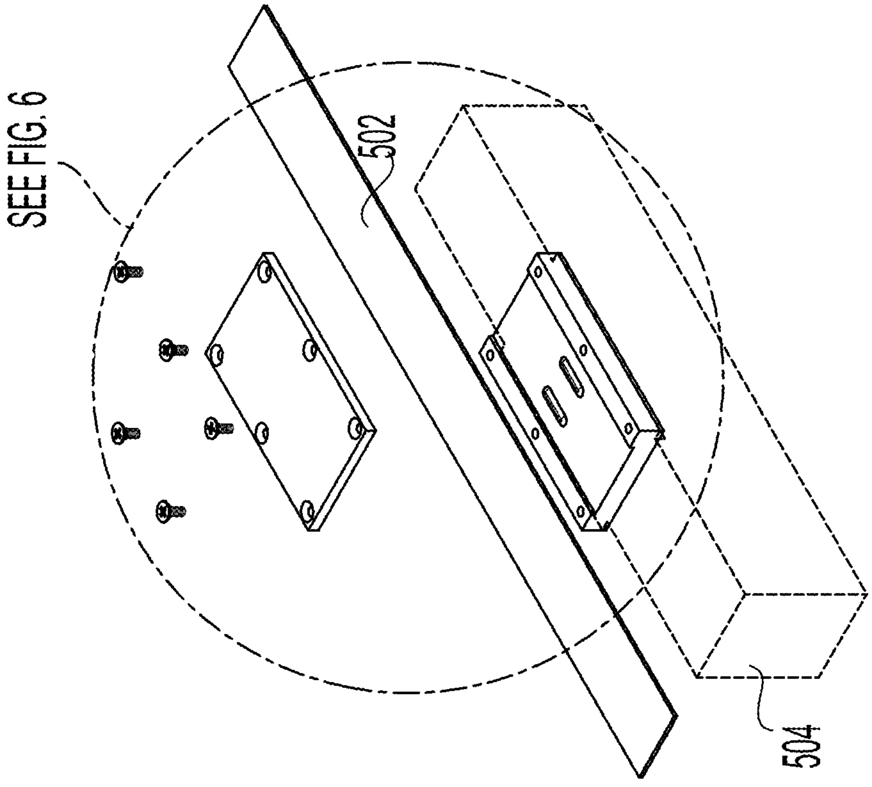

FIG. 5 show an exploded view of another light configuration 504 mounted to the strap 502 by way of the screw arrangement with detail shown in FIG. 6.

FIG. 6 shows a detail of another arrangement of the connection arrangement 605 with electrical connectors 620, 622 and the cover plate 624 which sandwich the strap 602 in place. In the example of FIG. 6, four screws 626 are used instead of nuts and bolts as in FIG. 3. In the example of FIG. 6, the screws 626 are threaded screws that thread into respective holes 627 in the connection arrangement 605 to secure the cover plate to the connection arrangement and thereby sandwich the strap 602 into place and connect the electrical connectors 620, 622 to the respective lines of conductive material (212, 214 in FIG. 2) on the strap 602.

Light Clamp Examples

Light attachments that are attached to the strap as described herein may be used to achieve two purposes: to secure the light fixture to the strap such that the light fixture would not move or slip even if positioned vertically or in a manner that gravity might pull it, and to provide an electrical connection from the connective elements in the strap to the light fixture such that electricity may flow between the two to turn the light in the light fixture on or off, dim, change color, or otherwise command the light.

Figure 8:
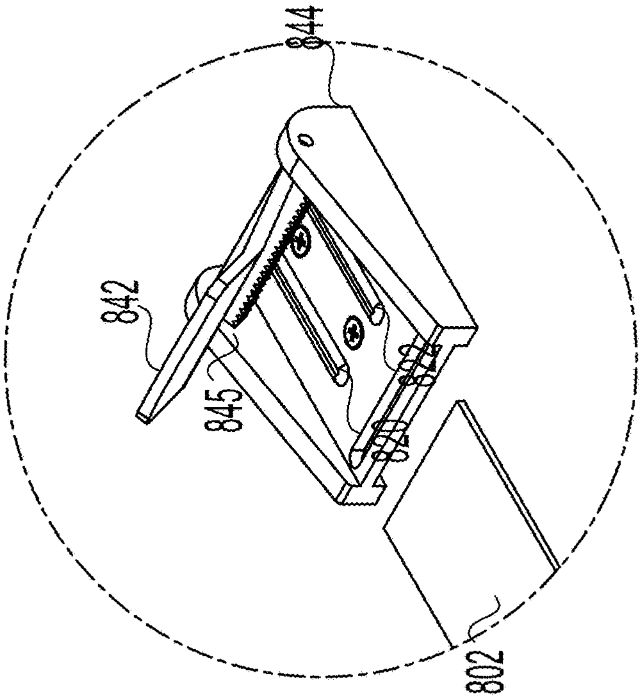
FIGS. 7-9 are example detail diagrams of lighting fixture connection clamps according to embodiments described herein.
Figure 7:
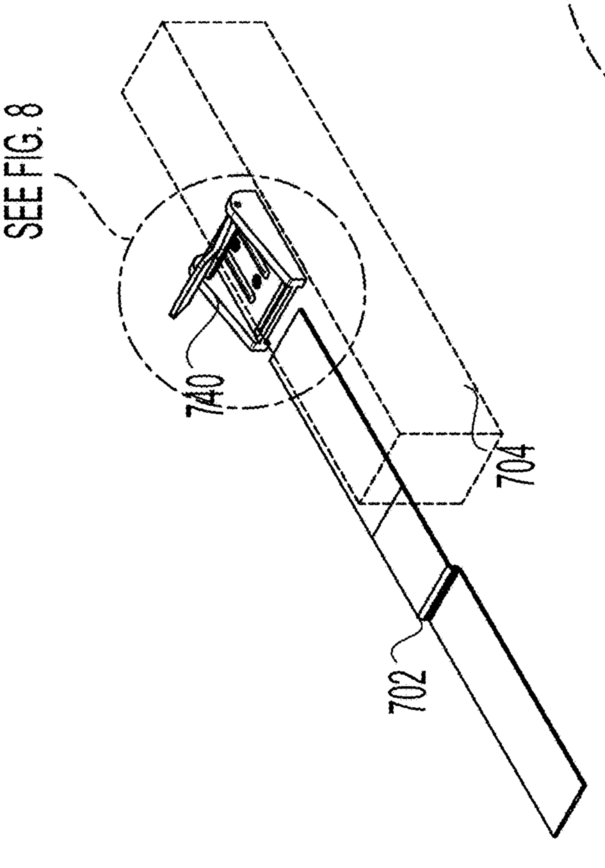

One example light clamp may be a friction fit lever arm clamp. Such an examples is shown in detail of FIGS. 7-9. In FIG. 7, the clamp 740 is shown mounted on any light fixture 704. FIG. 8 shows a detail of the strap 802 which may fit into the clamp 844 and slide through an opening between the clamp body 844 and the friction fit arm 842. In such a way, the electrical connectors 820, 822 on the clamp 844 may be in electrical contact with the respective lines of conductive material (212, 214 in FIG. 2) on the strap 802 and also secured in place.

The clamp (shown in an open position in FIG. 8 and closed position in FIG. 9) may include a row of teeth or knurl bar 845 that may help grab or secure the strap 802 when the friction fit arm 842 is lowered and clamped in place. Any kind of arrangement for the clamp may be used in order to allow for the strap 802 to slide through the clamp 844 when the friction fit arm 842 is open but secured in place when the friction fit arm is closed as shown in FIG. 9.

Figure 9:
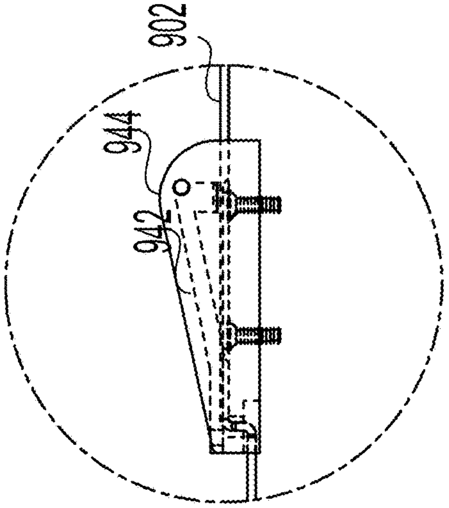

FIG. 9 shows the strap 902 running through the clamp body 944 with the friction fit arm 942 in the closed position. In such a position, the strap 902 is secured in place by the friction fit arm 942 and the electrical connectors (820, 824 in FIG. 8) are in connection with the respective lines of conductive material (212, 214 in FIG. 2).

More Strap Supported and Powered Light Fixture Examples

Figure 10:
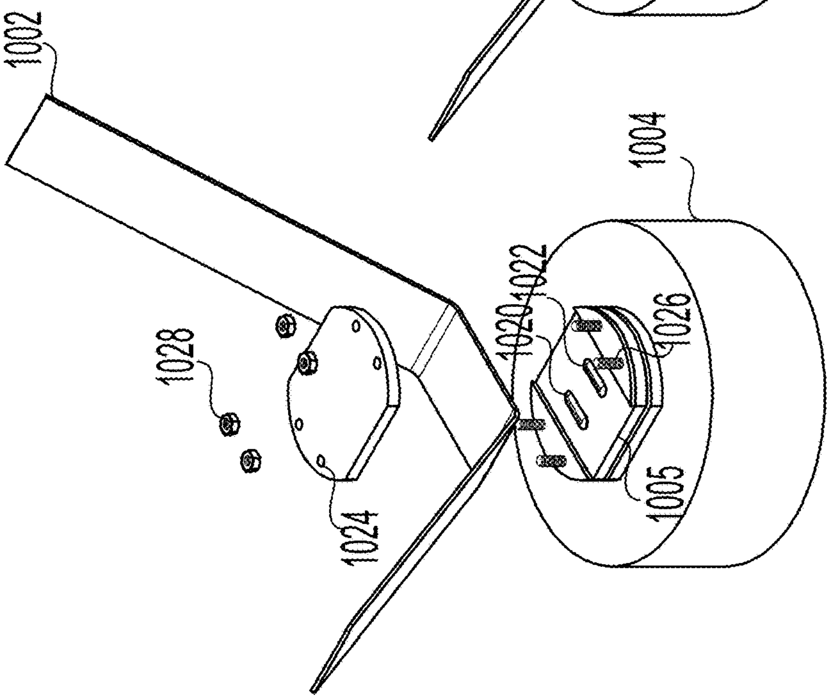
FIGS. 10-12 are example diagrams of a lighting fixture according to embodiments described herein.

FIG. 10 shows an example light fixture 1004 with the connection arrangement 1005 in an unassembled state with the cover plate 1024 off and the bolts 1026 and nuts 1028 not secured. In this example, the strap 1002 may be placed between the cover plate 1024 and connection assembly 1005 to align the electrical connectors 1020, 1022 to the respective lines of conductive material (212, 214 in FIG. 2) on the strap 1002.

Figure 11:
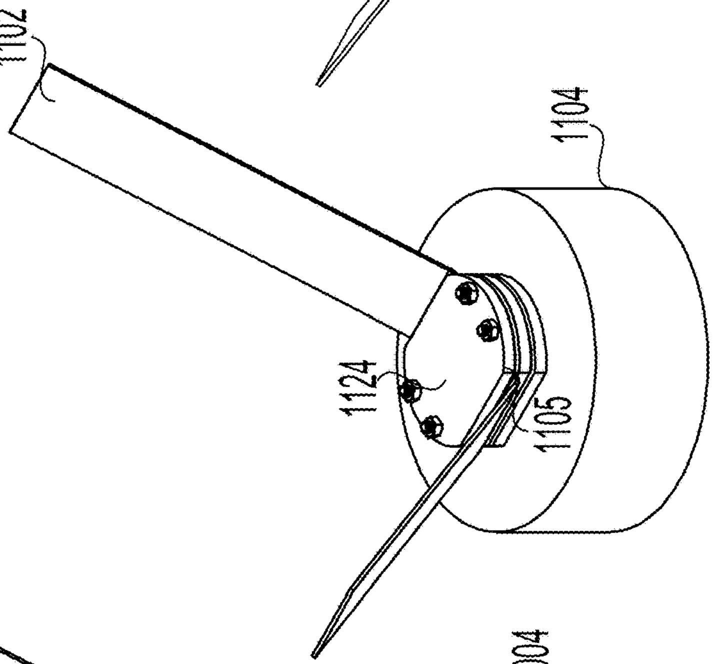
Figure 12:
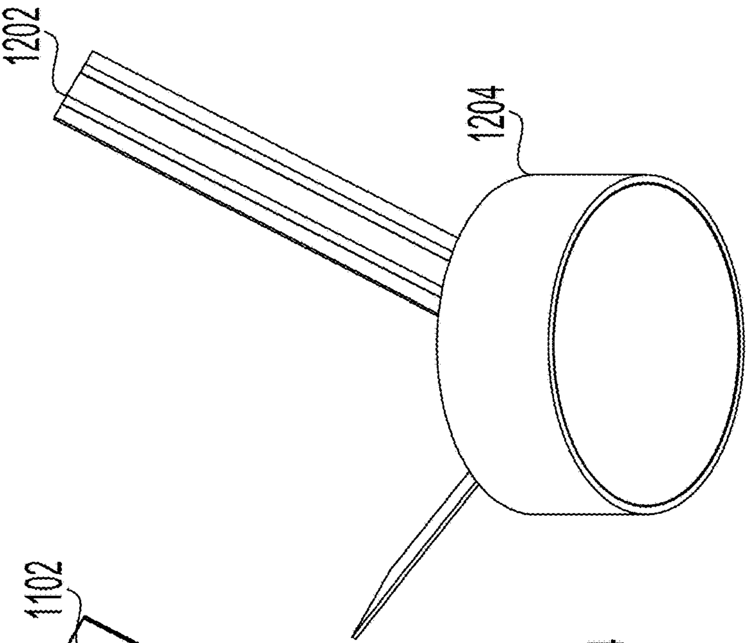

FIG. 11 shows the same light fixture and strap as FIG. 10 but in an assembled state, with the top cover plate 1124 secured to the connection arrangement 1105 to thereby secure the light fixture 1104 to the strap 1102 to both power, control and secure it. FIG. 12 shows an example light fixture 1204 secured to the strap 1202.

Power Source Examples

In the examples described herein, the strap may run on a constant voltage power source. In such examples, only one end of the strap needs to be connected to the power supply. The other end, opposite the end with the power supply, can be closed with non-power connector only. For example, the strap may be cut at whichever desired length and then a metal bar or other electrical conductive material is placed across the two respective lines of conductive material to close the circuit.

In such examples, the electrical may be connected to soldering only, hold down by plastic/non-power clip.

Additional Clamp Examples

Additionally or alternatively to the systems shown above, FIGS. 13-19 show features of an additional embodiment example of a clamp with the ability to open and close without screws. In such examples, the system (1105, 1124 in FIG. 11) that connects a light (1104 in FIG. 11) to the strap (1102 in FIG. 11) may be replaced by a quick connect system that allows opening and closing of the system without screws shown in FIGS. 13-19, but by using a hinged latch system with spring loaded electrical connection units as described herein. In the examples shown in FIGS. 13-19 the connection unit may be used additionally or alternatively, in conjunction with, to replace, or augment in any combination, the embodiments shown in FIGS. 1-12.

Figure 13:
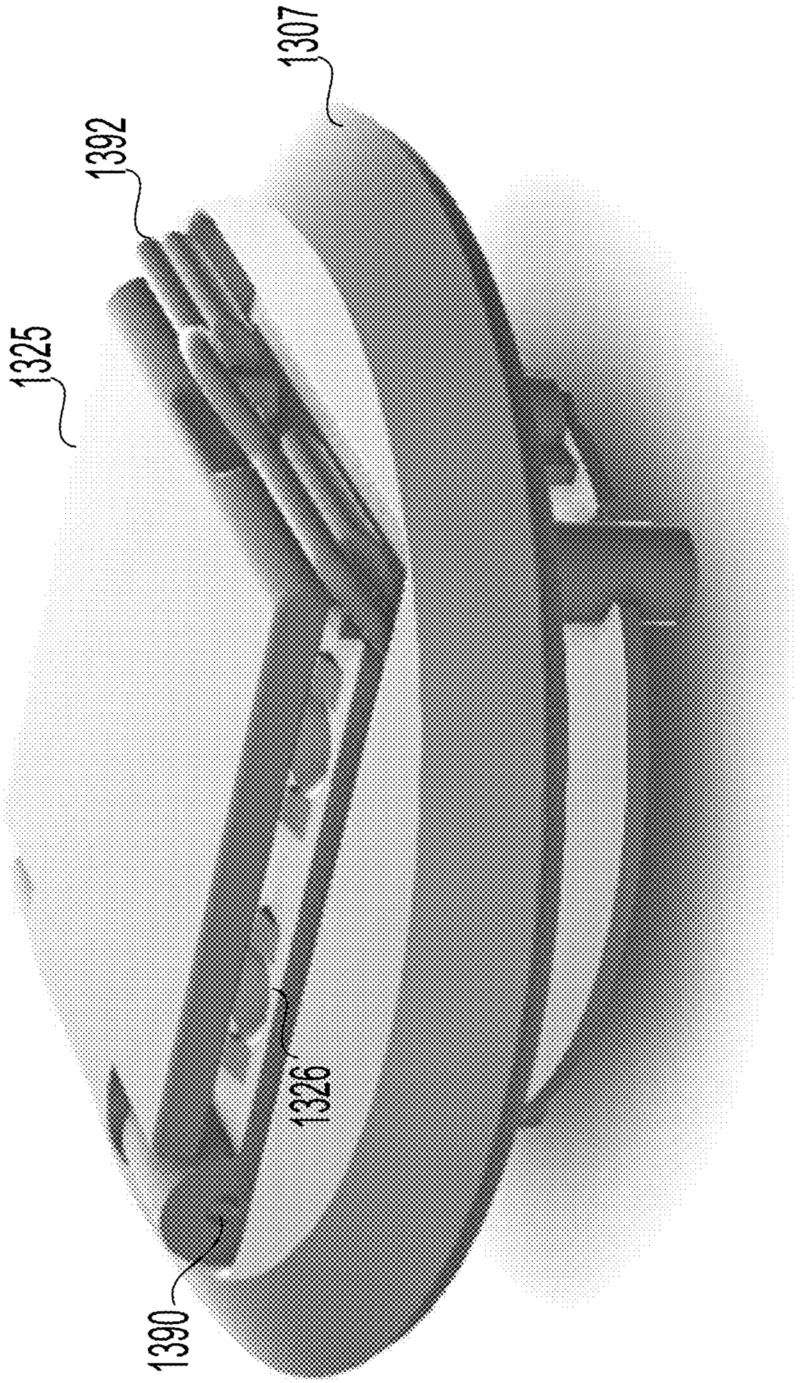
FIG. 13 is an example diagram of a connection element according to embodiments described herein.

In such example shown in FIG. 13, the baseplate system 1307 may be attached to, in communication with, or otherwise connected to and/or wired to a light as shown as 104 in FIG. 1, 304 in FIG. 3, 704 in FIG. 7, 1104 in FIG. 11, 1204 in FIG. 12, etc. In some examples, additionally or alternatively, such a system shown in FIG. 13 may be connected to a power source to provide electricity to the strap and any attached lights as described herein.

Such a baseplate system 1307 would include the electrical connection elements 1326 as described herein used to connect to the electrical components of the strap and thereby power a light fixture attached to the base or otherwise to the strap in another place. But instead of a top cover with a screw mechanism as shown in other example embodiments, the system in FIGS. 13-19 includes a hinged 1390 lid 1325 with a friction fit latch 1392. In such a way, the system may be opened and closed without the need of a screwdriver, by hand, and still allow for the clamping of a strap as described herein and the electrical connections to the conductive material in the strap as described to power a light fixture and/or light.

In some examples, alone or in combination with any embodiments described herein, the base and/or hinged lid may be insulative, dielectric or otherwise non-conductive. This allows for the conductive elements such as the electrical connection elements 1326 and springs (not shown) to conduct electricity without shorting and without bleeding current.

In some examples, a light may be integrated into the lid or base of such a system as described herein. In some examples, the system may merely provide security and no power. Any or all combination or permutations of such systems may be utilized with the straps, ribbons, lights, or other component parts as described herein. The embodiments are not intended to be limiting, and any combination is possible.

Figure 14:
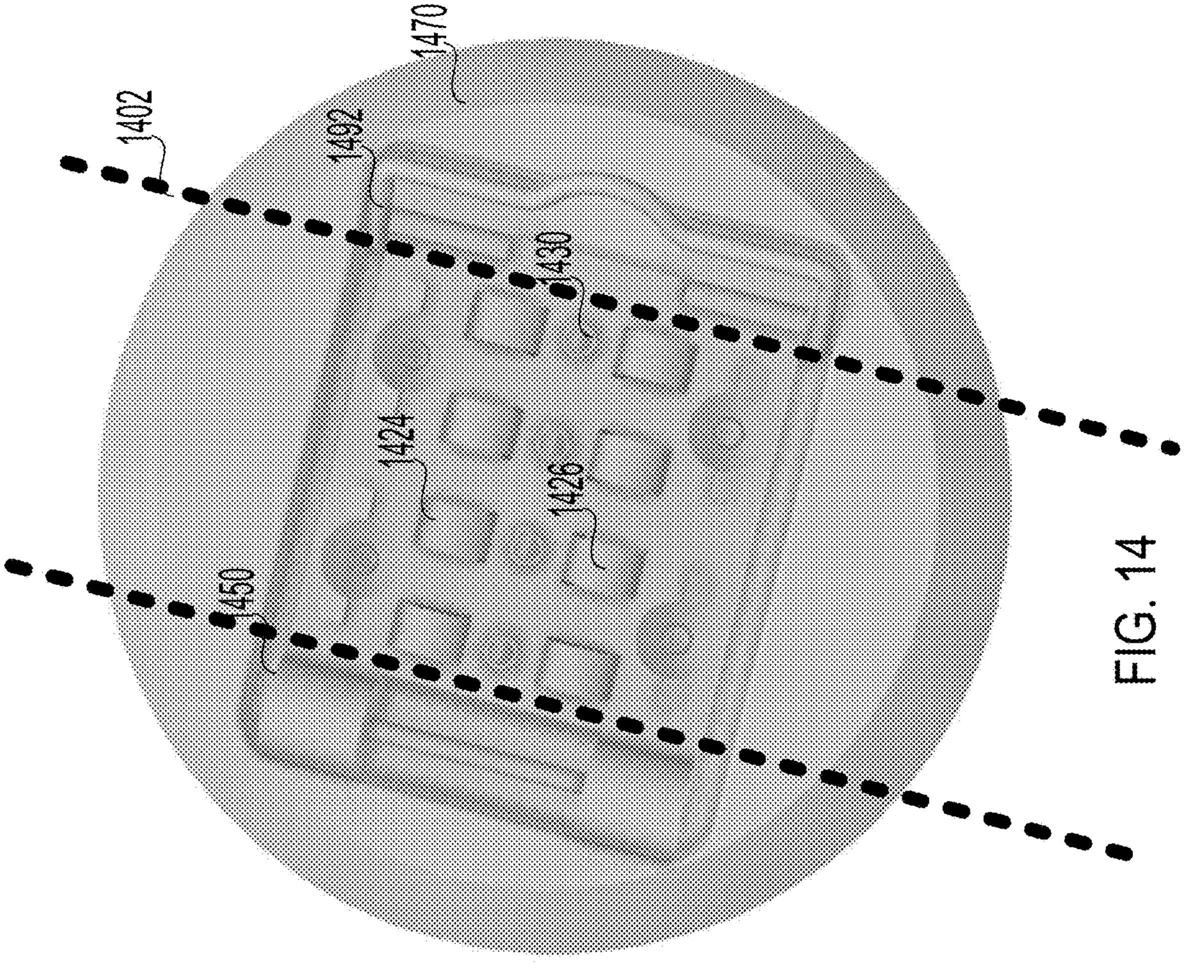
FIG. 14 is an example diagram of a connection element according to embodiments described herein.

In FIG. 14 a top-down view is shown of the base system 1470 without the hinged lid but showing where the strap 1402 would be placed across the system with multiple electrical connection elements 1424, 1426. In such a way, the strap 1402 which may include two or more lines of conductive material in them (as described above and in FIG. 2 as an example) may be placed in contact with the electrical connections 1424, 1426 of the base unit 1470. In practice, the lid (not shown in FIG. 14) may then be closed about the hinge 1450 and then secured by the latch 1492 to push and keep the strap 1402 in place against the electrical connections 1424, 1426. Thus, any power running through the strap may be connected to the electrical connections 1424, 1426, the springs 1430 and then to a load such as a light (not shown in FIG. 14 but shown as 1104 in FIG. 11, 1204 in FIG. 12, etc.). In any example here, any kind of electrical load may be placed on or mounted to the base such as a light, fan, screen, computer, antenna, or other electronic system. The use of a light in the examples here are merely illustrative.

In some examples, there may be two rows of electrical connections 1424, 1426. In some examples, there maybe four connections in each row of two, making eight total electrical connection points in the example. These may be spring mounted in order to provide a connection force as described herein.

Figure 15:
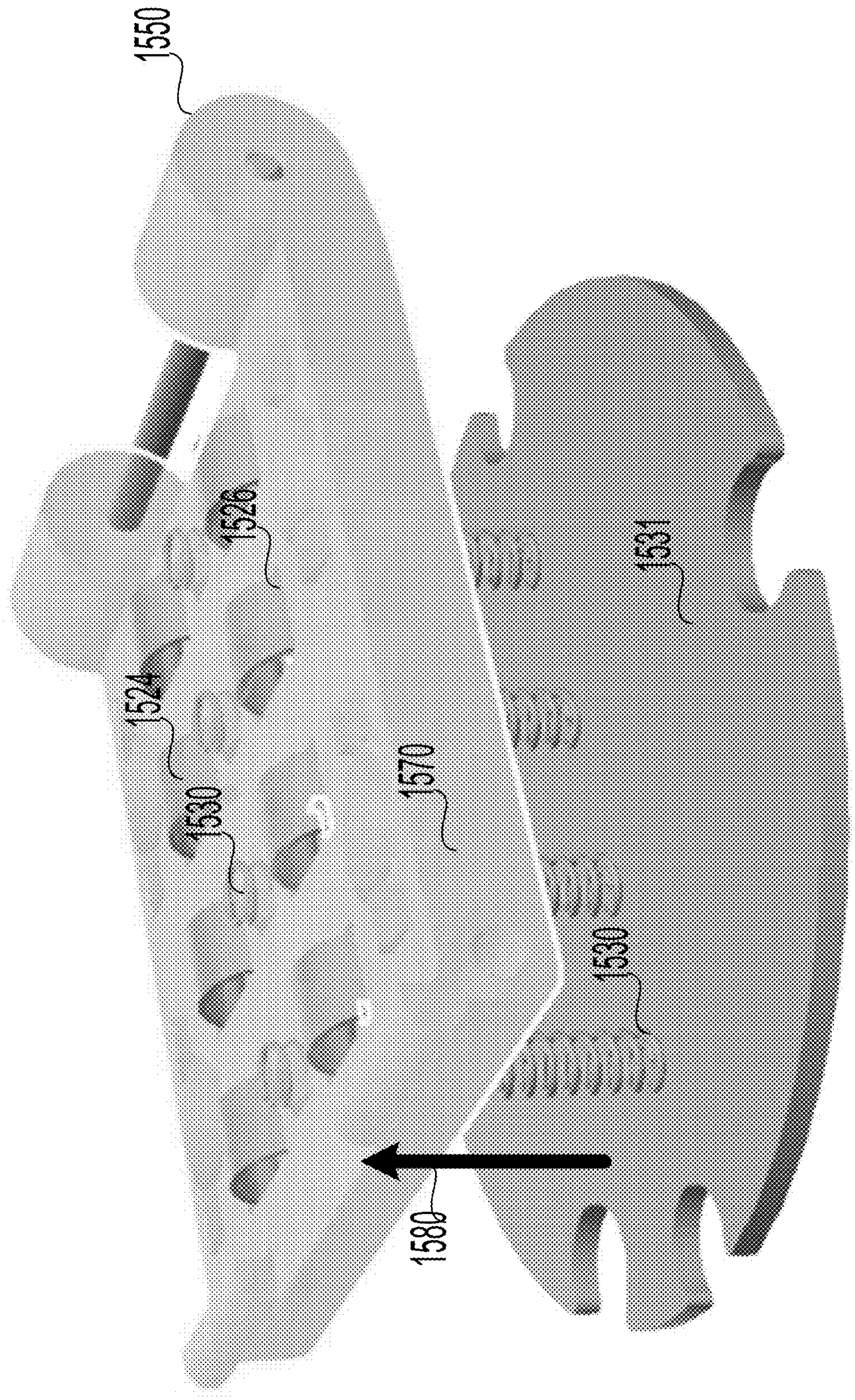
FIG. 15 is an example cutaway view of a connection element according to embodiments described herein.

FIG. 15 shows a view of internal mechanisms of the example base system with a top base section 1570 and hinge mechanism 1550 and also the electrical connection elements 1524, 1526 but also with the spring systems 1530 showing. In the example of FIG. 15, the hinged lid is not shown. In such examples, the compression springs 1530 may be arranged such that they push against the bottom base plate 1531 and support the electrical connection elements 1524, 1526 which are then pushing up against the top base plate 1570. In such a way, due to the bowed shape of the electrical connection elements 1524, 1526 which may extend through holes or ports in the top base plate 1570, they may be spring mounted. This system provides a spring force to push up (arrow 1580) on the electrical connection elements 1524 1526 to push against the strap (as shown in FIG. 2 etc.) and the electrical connection elements in the strap. This may provide both a secure mechanism for holding the strap but also to secure the electrical connection elements 1524, 1526 in the base plate to the electrically conductive elements in the strap itself to better conduct electricity.

Figure 16:
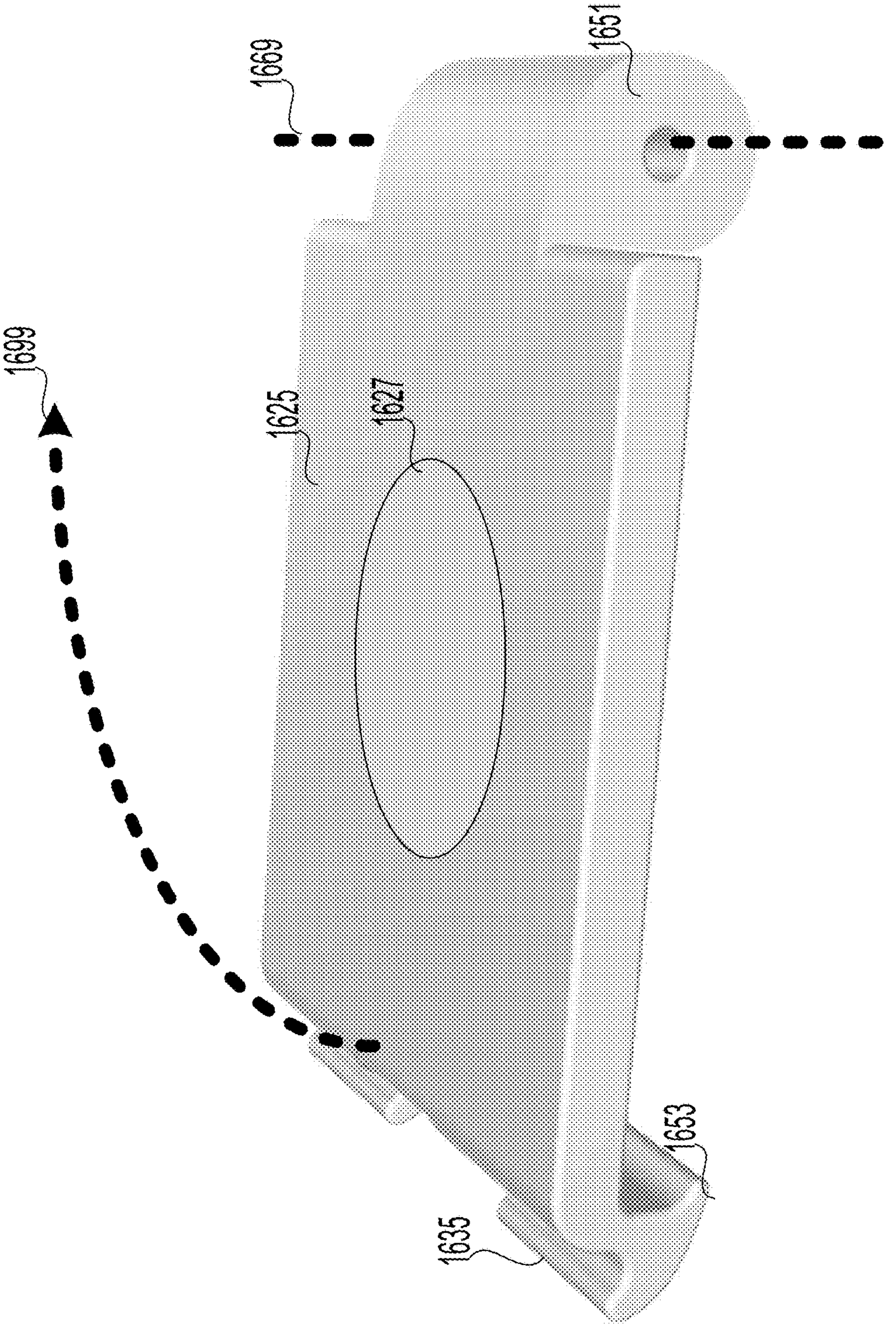
FIG. 16 is an example diagram of a cover according to embodiments described herein.

FIG. 16 shows the top hinged lid system 1625 which may be fit over the base section. The hinged lid 1625 may have a hinge portion 1651 with a pin (not shown but pivot axis shown in dashed line 1669) that fits into the base section to allow free hinged swinging movement shown by the arrow 1699. The lid 1625 shown in FIG. 16 also includes a friction fit lip 1653 which may snap over a portion of the base (not shown) to secure the lid in a closed position. In some examples, another outside lip 1635 may interact with a rotating latch system hinged to the base (not shown). Thus, the lid 1625 may be secured to the base section by both its own friction fit and an additional swinging latch system to apply pressure to close the system and hold the strap in place as described herein. In some examples, the lid 1625 may include a light 1627 mounted to shine from the lid, the light 1627 in communication with the electrical connection components (not shown in FIG. 16).

Figure 17:
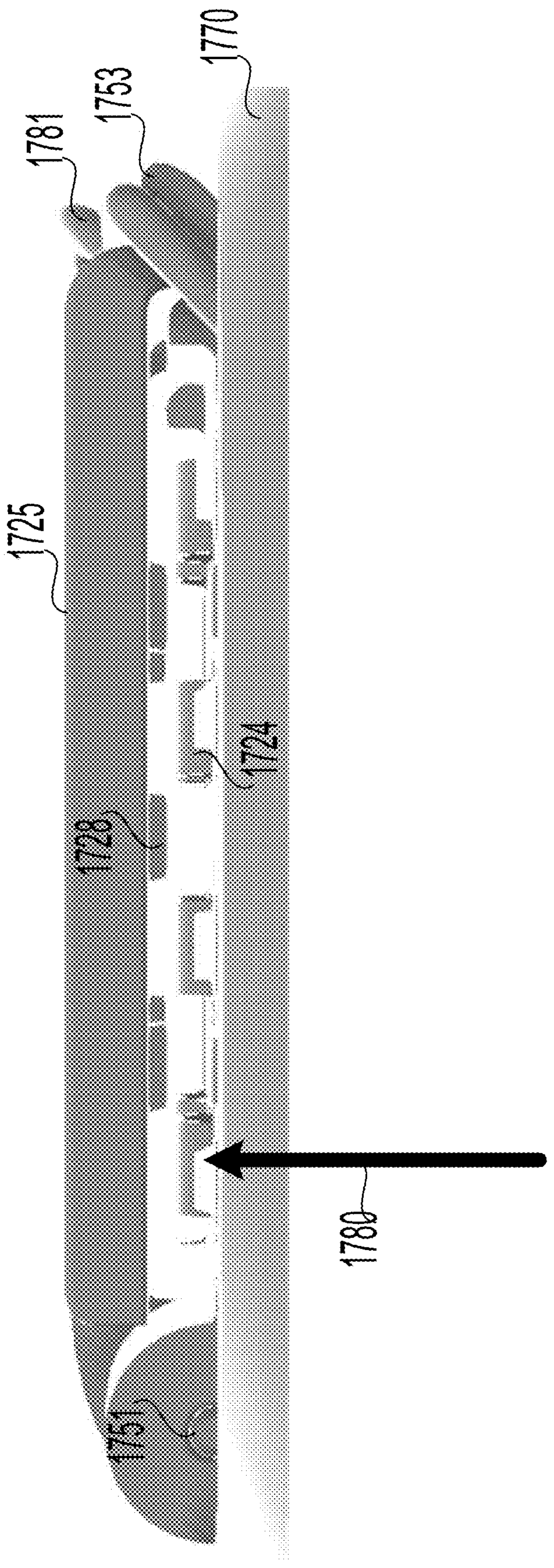
FIG. 17 is an example side view of a connection element according to embodiments described herein.

FIG. 17 shows a side-on view of the system in the closed position with the base 1770 and the lid 1725 closed on top. The load such as the light to be powered in not shown in FIG. 17. The lid hinge 1751 is shown interacting with the base plate. Also, the swinging latch 1781 is shown in the closed position on the lid latch 1753. Also shown in the side on view of FIG. 17 are the electrical connections 1724 protruding up above the top of the base 1770. In some examples, these electrical connections 1724 may be metal plates. In some examples, these electrical connections may include arches. This shows how when the strap is placed in the system and closed down, the extending electrical elements 1724 push up from the base (as shown by arrow 1780) and may interact with the strap and its electrical elements to provide a safe, secure, and tight friction fit and thereby an electrical connection.

In some examples, the lid 1725 may include bumps or raised portions 1728 configured to narrow the gap between the closed lid 1725 and the base 1770 with the electrical connector units 1724. In such a way, the raised portions 1728 may help secure the ribbon or strap if placed in the unit and then closed between the lid 1725 and base 1770. In some examples, these raised portions 1728 may be alternatively staggered between the rows of electrical connection units 1724. In some examples, there may be three rows of such protruding portions 1728 to fit between the four rows of electrical connection units 1724 when viewed from the end-on view as shown in FIG. 17.

Again, in some examples, alone or in combination with any embodiments described herein, the base 1770 and/or hinged lid 1725 may be insulative, dielectric or otherwise non-conductive. This allows for the conductive elements such as the electrical connection elements 1724 and springs (not shown) to conduct electricity without shorting and without bleeding current.

Figure 18:
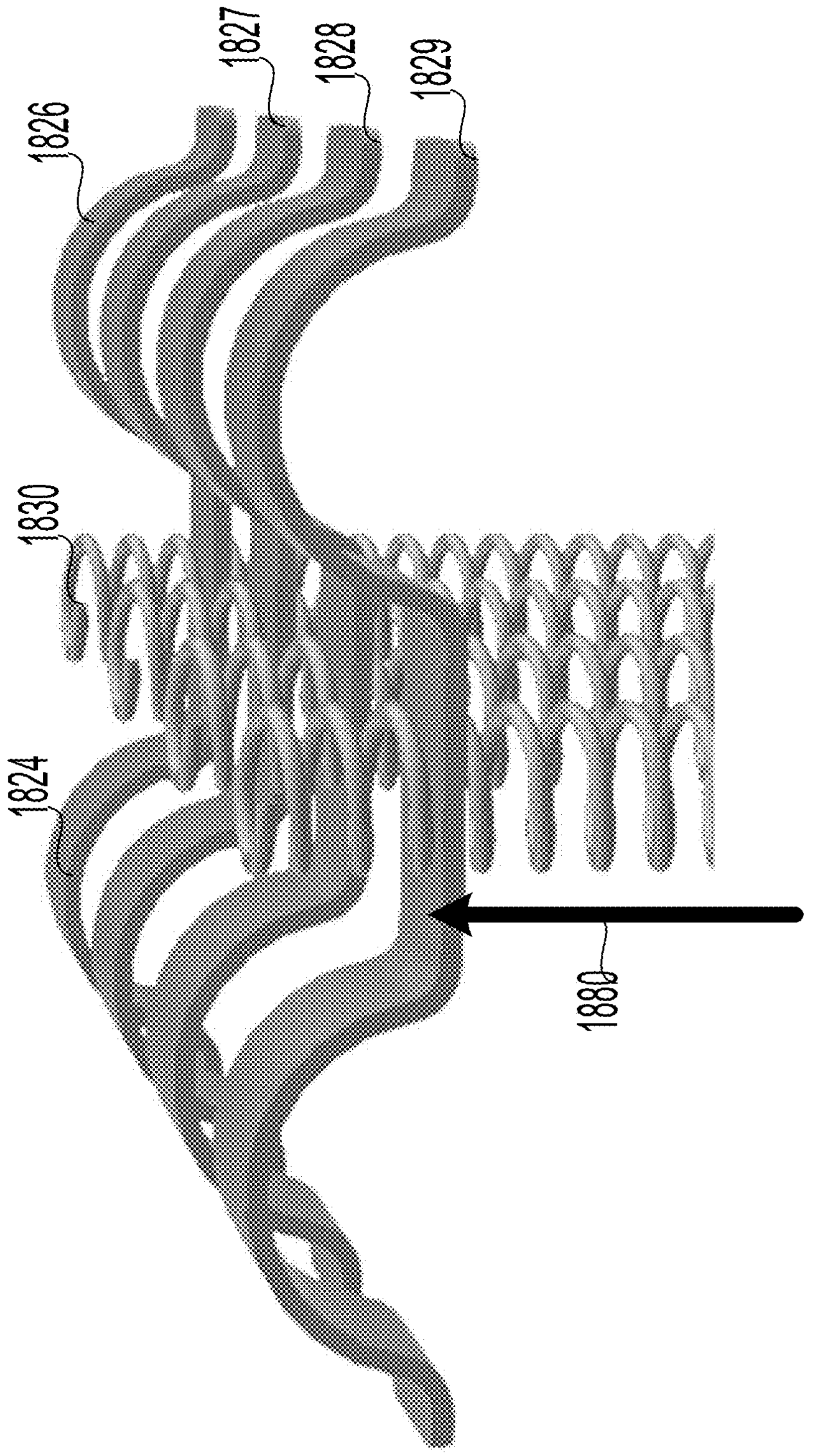
FIG. 18 is an example diagram of spring connectors according to embodiments described herein.

FIG. 18 shows an exploded view of just the springs 1830 and the electrical connection units 1824, 1826, 1827, 1828, 1829. The base plate is not shown in FIG. 18. As can be seen in FIG. 18, each spring 1830 in touching, interacts with, or otherwise is in communication with a double lobed electrical connection unit. In some examples, the unit includes an arched portion. In some examples, such electrical connection unit is made of metal or other electrically conductive material. In some examples, the spring 1830 is made of metal or some other electrically conductive material. In such examples, the spring units 1830 are configured to provide an upward spring force as shown by the arrow 1880 when pushed down for example, when the strap is placed in the system and thereby compresses the springs 1830 mounted to the electrical connection units 1824, 1826, 1827, 1828, 1829. As shown in detail in FIG. 18, each electrical connection unit 1824, 1826, 1827, 1828, 1829 includes two lobes or bent arches 1824, 1826 which may also provide a spring force return when compressed downward. In such examples, there may be two mechanisms to provide a return force to downward compression, both lobes of the electrical connection units 1824, 1826, 1827, 1828, 1829 as well as the spring 1830 forces 1880. These features may thereby combine to secure the strap as described within the latched system for a secure fit and to provide good electrical connection as described.

In some examples, the springs 1830 may conduct electricity to or from the electrical connection units 1824, 1826, 1827, 1828, 1829. In such examples, a power source (not shown) may send electricity through the strap and up and through the electrical connections 1824, 1826, 1827, 1828, 1829 and the lobes of the electrical connections to the springs 1830 to the load such as the light (not shown) using consecutive element features that are electrically conductive as described herein for example in FIG. 2.

FIG. 19 show another angle of the springs 1930 the base plate 1931 and the electrical component units 1924, 1926 as well as the hinged lid 1925 as described. In some examples, the base plate may be in connection with a load such as a light and be electrically conductive, allowing electricity to flow between the electrical component units 1924, 1926, the springs 1930, and the base plate 1931.

In such examples, the top base part is not shown, but as can be seen the strap may fit between the electrical component units 1924, 1926 and the top lid 1925 to be secured in place by the upward spring force as shown by arrow 1980 and also the force exerted by the arches in the metal plates 1924, 1926. In such examples, the base (not shown) and the hinged lid 1925 may be insulative or otherwise non-conductive. The springs 1930 may be compression springs configured to provide a return force 1980 when compressed, and in some examples, electrically conductive. Also shown in FIG. 19 are the raised portions 1928 on the inside of the lid 1925 configured between the rows of electrical connection arches 1924, 1926. These raised portions 1928 may help hold or secure the ribbon or strap (not shown in FIG. 19) when the lid is closed and secured in place.

CONCLUSION

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the embodiments have been specifically described herein, it will be apparent to those skilled in the art to which the embodiments pertain that variations and modifications of the various implementations shown and described herein may be made without departing from the spirit and scope of the embodiments. Accordingly, it is intended that the embodiments be limited only to the extent required by the applicable rules of law.

What is claimed is:

1. A system, comprising:

a base with a first hole and a second hole;

a metal plate with a first arch and a second arch, wherein the metal plate is mounted such that the first arch extends into and through the first hole of the base plate and the second arch is extends into and through the second hole of the base plate;

a compression spring mounted to the metal plate configured to provide a return force if compressed;

a hinged lid mounted to the base plate configured to be in an open position and a closed position, the closed position being closed over the first hole and second hole with the first arch and second arch;

a light in electrical communication with the compression spring and the metal plate;

a flexible ribbon strap with a length and a width, wherein the flexible ribbon strap having two electrically conductive elements running the length;

wherein the flexible ribbon strap configured to be secured between the base and hinged lid when the lid is in the closed position, and the flexible ribbon strap two electrically conductive elements aligned to the first arch and second arch of the metal plate.

2. The system of claim 1 further comprising a raised bump on the hinged lid configured between the first arch and the second arch when the lid is in the closed position.

3. The system of claim 1 wherein the base plate includes a third and fourth hole.

4. The system of claim 3 further comprising a second metal plate with a first arch and a second arch, the second metal plate first arch configured to mount through the third hole in the base plate and the second metal plate second arch configured to mount through the fourth hole in the base plate;

and a second spring mounted to the second metal plate configured to provide a return force if compressed.

5. The system of claim 1 wherein the base plate includes a fifth and sixth hole.

6. The system of claim 5 further comprising a third metal plate with a first arch and a second arch, the third metal plate first arch configured to mount through the fifth hole in the base plate and the third metal plate second arch configured to mount through the sixth hole in the base plate;

and a third spring mounted to the third metal plate configured to provide a return force if compressed.

7. The system of claim 6 wherein the base plate includes a seventh and eighth hole.

8. The system of claim 7 further comprising a fourth metal plate with a first arch and a second arch, the fourth metal plate first arch configured to mount through the seventh hole in the base plate and the fourth metal plate second arch configured to mount through the eighth hole in the base plate;

and a fourth spring mounted to the fourth metal plate configured to provide a return force if compressed.

9. The system of claim 8 wherein the hinged lid includes three rows of raised portions configured between the four metal plates with arches mounted through the holes in the base.

10. The system of claim 1 wherein the base and hinged lid are made of non-conductive material.

* * * * *